United States Patent [19]

Schmid

[11] Patent Number: 4,649,546

[45] Date of Patent: Mar. 10, 1987

[54] GAS LASER

[75] Inventor: Rudolf Schmid, Ottobrunn, Fed. Rep. of Germany

[73] Assignee: Siemens Aktiengesellschaft, Berlin and Munich, Fed. Rep. of Germany

[21] Appl. No.: 577,272

[22] Filed: Feb. 6, 1984

[30] Foreign Application Priority Data

Feb. 17, 1983 [DE] Fed. Rep. of Germany ....... 3305462

[51] Int. Cl.$^4$ .............................................. H01S 3/02
[52] U.S. Cl. ...................................... 372/61; 350/319; 372/103
[58] Field of Search .................... 372/103, 61; 350/319

[56] References Cited

U.S. PATENT DOCUMENTS

| | | | |
|---|---|---|---|
| 3,390,351 | 6/1968 | Bell | 331/94.5 D |
| 3,555,450 | 1/1971 | Rockwell, Jr. | 372/103 |
| 3,883,214 | 5/1975 | Hoffman | 350/319 |
| 3,955,152 | 5/1976 | Lewis | 331/94.5 D |
| 3,988,698 | 10/1976 | Crane et al. | 331/94.5 D |
| 4,063,803 | 12/1977 | Wright et al. | 350/319 |
| 4,240,046 | 12/1980 | Kolb, Jr. et al. | 331/94.5 D |

FOREIGN PATENT DOCUMENTS 2603267  8/1976  Fed. Rep. of Germany .
2604740  8/1976  Fed. Rep. of Germany .

Primary Examiner—James W. Davie
Attorney, Agent, or Firm—Herbert L. Lerner; Laurence A. Greenberg

[57] ABSTRACT

A gas laser, includes:
a tube having two ends to be filled with gas; and
a plate-shaped window hermetically sealing at least one of the ends of the tube;
the window including a carrier plate and a layer coating the inside of the carrier plate;
the tube being formed of a first material with a first thermal coefficient of expansion ($H_1$) at least in vicinity of the one end thereof having the window;
the layer being formed of a second material with a second thermal coefficient of expansion ($H_2$);
the carrier plate being formed of a third material with a third thermal coefficient of expansion ($H_3$);
the first and second materials being unadapted to each other; and
the third material being thermally matched to the first material.

15 Claims, 2 Drawing Figures

GAS LASER

BACKGROUND OF THE INVENTION

1. Field of the Invention: The invention relates to a gas laser having a gas-filled tube hermetically sealed at least at one of the two ends thereof by a plate-shaped window, which may be inclined at the Brewster angle, the tube being formed of a first material with a thermal coefficient of expansion $H_1$ at least at its end facing the window, and the window being formed of a second material with a thermal coefficient of expansion $H_2$, at least on the side or inside thereof facing the end of the carrier, and the two materials being unmatched to each other ($\Delta H = |H_1 - H_2| > 10 \times 10^{-7} \, °K^{-1}$). Such a laser structure is known from U.S. Pat. No. 4,063,803.

2. Description of the Related Art:

In many cases, the use of material for the laser tube and its optical terminations or ends having thermal coefficients of expansion which greatly differ from each other, cannot be avoided. Thus, Brewster windows are usually of quartz because this material is intrinsically highly transparent, absorbs practically no impurities even after extended operation and can, in addition, be smoothed without too much effort. On the other hand, certain kinds of glass which are easier to process and above all, are heliumtight as well, are preferred for the tube jacket or the capillary. These types of glass have a thermal coefficient of expansion which is in general between $35 \times 10^{-7}$ degrees $K^{-1}$ (hard glass of the borosilicate type) and $95 \times 10^{-7}$ degrees $K^{-1}$ (soft glass with lead oxide added). They are therefore not thermally matched to quartz with its extremely low value of maximally $5 \times 10^{-7}$ degrees $K^{-1}$. In other words, a glass solder or fused joint which could reliably seal the gas space of the laser cannot be made.

SUMMARY OF THE INVENTION

In principle, such a mismatch would not be critical if the optical terminations or ends are fixed to the tube with an epoxy resin, such as is described in U.S. Pat. No. 3,390,351. Organic adhesives require relatively low processing temperatures and remain entirely elastic, even in the hardened state. However, they limit the useful life of the laser because they are not completely impermeable, do not permit high baking-out temperatures, and furthermore continuously give off their own components into the gas space.

For this reason, most gas laser manufacturers decided to use a glass solder technique some years ago and have developed various concepts to thermally relieve the solder joint, in the course of time. At first, an attempt was made to mount the optical termination elements in flexible metal settings, as described in the U.S. Patent mentioned above or in U.S. Pat. No. 3,555,450. However, this idea did not find acceptance in practice because the solder joint could still be torn off under stresses due to heat, or the termination elements could be forced out of adjustment by the deforming metal.

A stepped connection with several intermediate pieces which are as strong as the tube and lead the terminating element and both values into each other over permissible steps, are customarily used today. This method yields good results but it is cumbersome and expensive. Thus, a 25-mW HeNe laser which is commercially available and in which a hard glass capillary is combined with a quartz window, contains four different intermediate glasses, such as in Model "107" sold by Spectra-Physics.

It is accordingly an object of the invention to provide a gas laser and method for manufacturing the same, which overcomes the hereinafore-mentioned disadvantages of the heretofore-known devices and method of this general type, which ends a laser tube of a given material with a transparent element which completely fulfills its functions, and in addition can be joined to the tube in a simple and vacuum-tight manner.

With the foregoing and other objects in view there is provided, in accordance with the invention, a gas laser comprising:

a tube having two ends to be filled with gas; and a plate-shaped window hermetically sealing at least one of the ends of the tube;

the window including a carrier plate and a layer coating the inside of the carrier plate;

the tube being formed of a first material with a first thermal coefficient of expansion ($H_1$) at least in vicinity of the one end thereof having the window;

the layer being formed of a second material with a second thermal coefficient of expansion ($H_2$);

the carrier plate being formed of a third material with a third thermal coefficient of expansion ($H_3$);

the first and second materials being unadapted or unmatched to each other; and the third material being thermally matched to the first material.

This may be done such that $\Delta H = |H_1 - H_2| > 10 \times 10^{-7} °K^{-1}$.

The invention is based on test results which were first obtained with quartz-coated glass carriers. Wihin the scope of these experiments, it was found that the overall body has the following properties if the layer is applied under uniform conditions with a thickness of several tenths of a laser wavelength:

(1) Its value corresponds to that of the carrier, so that conventional glass solders and manageable soldering techniques can be used.

(2) The layer withstands temperature stresses typical of lasers, although it must follow the expansion and shrinkage motions of its substrate during the process.

(3) The layer surface is almost exactly as flat as the surface of its substrate; it is accordingly sufficient to polish the carrier plate with the usual care.

(4) The index of refraction n of the layer is constant everywhere and usually deviates somewhat from the n-value of a solid plate of the same material. In a Brewster window, excellent polarization and reflection conditions are practically always obtained if an angle of inclination is observed which is optimum for the carrier.

(5) The layer is light-transparent and resistant to surface contamination, exactly like a body which is formed of the same material and has the same surface quality as the layer carrier.

In accordance with another feature of the invention, the window is inclined at the Brewster angle relative to the tube.

In order to coat the carrier plate, sputtering and CVD (chemical vapor disposition) techniques are of particular interest; however, a vapor disposition method is also conceivable.

In accordance with a further feature of the invention, the layer has a thickness of substantially between 0.07 $\mu$m and 0.5 $\mu$m and, in particular, between 0.1 $\mu$m and 0.3 $\mu$m. The thermal coefficient of expansion $H_2$ and $H_3$ of the layer and the carrier, respectively, may differ by more than $100 \times 10^{-7}$ degrees $K^{-1}$ without difficulty. In the preferred material pairings, quartz or glass, the H differences are generally over $25 \times 10^{-7}$ degrees $K^{-1}$, frequently over $40 \times 10^{-7}$ degrees $K^{-1}$, and not infrequently over $65 \times 10^{-7}$ degrees $K^{-1}$. The carrier plate should be formed of soft glass, at least if a particularly strong joint is important, because soft glass is thermally compatible with glass solders having excellent adhesion.

Quartz/ (soft) glass windows are recommended, particularly for high power HeNe lasers, because they offer a further advantage in such lasers: the HeNe mixture also generates IR laser light which can pass through quartz and must therefore be specially suppressed, so that the laser line used is given its full intensity. Accordingly, in the above-mentioned laser type "107" by Spectra-Physics, the capillary is surrounded by an inhomogeneous magnetic field over its entire length. Such expensive measures are not required if a quartz-improved glass window is used, because glass absorbs in the infrared region.

In accordance with an added feature of the invention, there is provided another layer formed of the second material coating the outside of the carrier plate.

In accordance with an additional feature of the invention, the third material forming the carrier plate is the same as the first material.

In accordance with again another feature of the invention, there is provided glass solder connecting the window to the one end of the tube.

In accordance with again a further feature of the invention, $25 \times 10^{-7}{}^{o}K^{-1} \leq \Delta H \leq 140 \times 10^{-7}{}^{o}K^{-1}$, particularly $40 \times 10^{-7}{}^{o}K^{-1} \leq \Delta H \leq 110 \times 10^{-7}{}^{o}K^{-1}$, and preferably $65 \times 10^{-7}{}^{o}K^{-1} \leq \Delta H \leq 95 \times 10^{-7}{}^{o}J^{-1}$.

In accordance with again an added feature of the invention, the first material is hard or soft glass.

In accordance with again an additional feature of the invention, the first material is hard glass, and $45 \times 10^{-7}{}^{o}K^{-1} \leq H_1 \leq 60 \times 10^{-7}{}^{o}K^{-1}$ or it is soft glass and $70 \times 10^{-7}{}^{o}K^{-1} \leq H_1 \leq 100 \times 10^{-7}{}^{o}K^{-1}$.

In accordance with yet another feature of the invention, the first and third materials are soft glass.

In accordance with yet a further feature of the invention, the second material is quartz.

In order to produce the gas laser, there is provided a method which comprises:
finishing and polishing the carrier plate;
subsequently applying the layer to the carrier plate; and
subsequently hermetically sealing the tube to the carrier plate and the layer.

In accordance with a concomitant mode of the invention, there is provided a method which comprises applying the layer to the carrier plate by sputtering, vapor-disposition, or a CVD method.

Other features which are considered as characteristic for the invention are set forth in the appended claims.

Although the invention is illustrated and described herein as embodied in a gas laser and method for manufacturing the same, it is nevertheless not intended to be limited to the details shown, since various modifications and changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
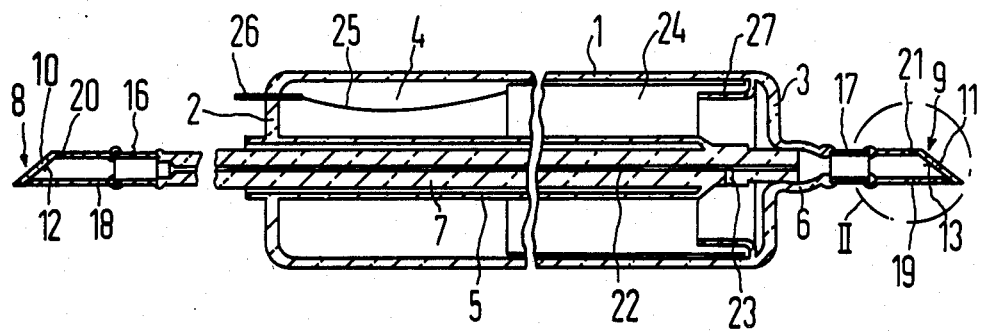
FIG. 1 is a diagrammatic cross-sectional view of a laser tube.

Referring now to the figures of the drawing in detail, in which corresponding parts are provided with the same reference symbols, and first particularly to FIG. 1 thereof, it is seen that the laser tube shown belongs to a 25-mW HeNe gas laser. Specifically, the laser tube contains a cylindrical jacket 1 which is closed at the end faces thereof by respective end plates 2, 3; this hollow body of the tube defines a space 4 therein. A tube 5, which is a so-called fixing tube, extends far into the space 4, and passes through the end plate 2. A tubular outwardly pointing stub 6 with a calibrated inner periphery, is formed on the end plate 3. A capillary 7 is pushed through the fixing tube 5 into the interior of the hollow body of the tube without making contact, and one end thereof rests in the stub 6 with a close fit. All of the parts are joined together to form an integral rotationally-symmetrical body as seen in FIG. 1.

Figure 2:
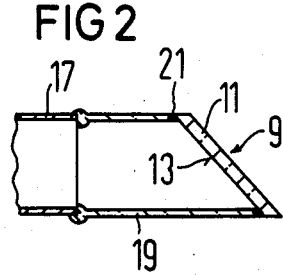
FIG. 2 is an enlarged, fragmentary, cross-sectional view of one of the two end sections of the tubes in FIG. 1 within the dot-dash circle II.

The capillary 7 and the extension 6 are sealed off from the outside by respective Brewster windows 8, 9. As can best be seen from FIG. 2, each Brewster window is formed of a respective carrier plate 10, 11 which is coated on the inside thereof with a respective layer 12, 13. The carrier plates are not thermally matched to the capillary and the stub. Therefore, transition pieces, namely rings 16, 17 and tubes 18, 19 are interposed between the capillary and stub on one hand, and the carrier plates, on the other hand. The tubes 18, 19 are cut at an angle $\alpha 56°\ 40'$ and are hermetically joined to the Brewster windows 8 and 9 by glass solder 20, 21.

The capillary 7 has a hole 22 formed therein which is in communication with the space through an opening 23. A hollow cold cathode 24 which is disposed in this space, is electrically connected by a lead 25 to a feed-through 26 inserted into the end plate 2. The opening 23 is shielded from impurities coming from the cold cathode 4, by a protective globe or bell 27 projecting from the jacket 1. In the operation of the tube, a gas discharge burns between the cathode 24 and the metal ring 16 acting as the anode.

The body formed by parts 1 to 7 is made of hard glass which is sold by the firm Schott under the designation "8250", and has a thermal coefficient of expansion H of $49 \times 10^{-7}$ degrees $K^{-1}$. This type of glass can be highly stressed mechanically and thermally. The carrier plates 10, 11 and the tubes 18, 9 are formed of soft glass "GW" which is also sold by Schott, that has a H value of $95 \times 10^{-7}$ degrees $K^{-1}$ and can be ground and soldered particularly well. The glass solder is a soft solder which can be obtained from Schott under the designation "G 017/292", which matches the glass type "GW" and perfectly wets the surfaces to be joined. The layers 12 and 13 are formed of a quartz which is sputtered-on up to a thickness of about 0.1 μm. Zirconium is used as the cathode material. The hermetically sealed space is filled with an HeNe mixture of 2.6 mbar; the gas discharge is fired with a voltage of 12 kV and maintained with a voltage of 4 kV.

Calculations have shown that the reflection and polarization conditions are influenced surprisingly little in a Brewster window by the layer coating. If a wavelength of 632 nm, an angle of incidence $\alpha$ of 56.6°, an n-value of 1,457 for the layer and an n-value of 1,520 for the carriage are assumed, and if the layer thickness d is varied between zero and 1000 nm, the reflection factor Rp for light which oscillates in the plane of incidence, varies between 0 and 0.052%; the first minimum in this case is at d=260 nm. If the angle of incidence $\alpha$ is also changed in addition to the layer thickness d, the Rp value always remains below 0.1% for $\alpha$-deviations between +1° and −3° from 56.6°. Interference effects therefore do not play an appreciable part.

The invention is not limited to the embodiments shown. Thus, the Brewster windows could also be coated on both sides if it is to meet the very strictest requirements. In addition, the end pieces could also be fastened to the tube in a way which does not use glass solder, such as by a direct fusion or diffusion joint. Furthermore, there is also considerable latitude in the choice of material. Thus, a large number of suitable glasses and glass solders is available, some of which are described in German Published, Non-Prosecuted Applications DE-OS No. 26 03 267 and DE-OS No. 26 04 740 corresponding to U.S. Pat. Nos. 3,955,152 and 3,988,698, respectively. Optionally, instead of glass and quartz, the layer or the carrier plate may be made of mica and/or an (oxide) ceramic such as BeO or $Al_2O_3$ may be used for the tube end. Normally, the H-value of the layer in this case will be lower than that of the carrier and the tube end; this, however, is not mandatory.

The foregoing is a description corresponding in substance to German Application No. P 33 05 462 2, filed Feb. 17, 1983, the International priority of which is being claimed for the instant application, and which is hereby made part of this application. Any material discrepancies between the foregoing specification and the aforementioned corresponding German application are to be resolved in favor of the latter.

I claim:

1. In a gas laser, comprising:
a tube having two ends to be filled with gas; and
a plate-shaped window hermetically sealing at least one of said ends of said tube;
said window including a carrier plate and a layer coating the inside of said carrier plate;
said tube being formed of a first material with a first thermal coefficient of expansion ($H_1$) at least in the vicinity of said one end thereof having said window;
said layer being formed of a second material being quartz with a second thermal coefficient of expansion ($H_2$);
said carrier plate being formed of a third material with a third thermal coefficient of expansion ($H_3$);
said first and second materials being thermally unadapted to each other; and
said third material being thermally matched to said first material.

2. In a gas laser, comprising:
a tube having two ends to be filled with gas; and
a plate-shaped window hermetically sealing at least one of said ends of said tube;
said window including a carrier plate and a layer coating the inside of said carrier plate;
said tube being formed of a first material with a first thermal coefficient of expansion ($H_1$) at least in the vicinity of said one end thereof having said window;
said layer being formed of a second material being quartz with a second thermal coefficient of expansion ($H_2$);
said carrier plate being formed of a third material with a third thermal coefficient of expansion ($H_3$);
said first and second materials being thermally unadapted to each other such that $\Delta H = |H_1 - H_2| > 10 \times 10^{-7} \,{}^\circ K^{-1}$; and
said third material being thermally matched to said first material.

3. Gas laser according to claim 1, wherein said window is inclined at the Brewster angle relative to said tube.

4. Gas laser according to claim 1, wherein said layer has a thickness of substantially between 0.07 $\mu$m and 0.5 $\mu$m.

5. Gas laser according to claim 1, including another layer formed of said second material coating the outside of said carrier plate.

6. Gas laser according to claim 1, wherein said third material forming said carrier plate is the same as said first material.

7. Gas laser according to claim 1, including glass solder connecting said window to said one end of said tube.

8. Gas laser according to claim 2, wherein: $25 \times 10^{-7} \,{}^\circ K^{-1} \leq \Delta H \leq 140 \times 10^{-7} \,{}^\circ K^{-1}$.

9. Gas laser according to claim 2, wherein: $40 \times 10^{-7} \,{}^\circ K^{-1} \leq \Delta H \leq 110 \times 10^{-7} \,{}^\circ K^{-1}$.

10. Gas laser according to claim 2, wherein: $65 \times 10^{-7} \,{}^\circ K^{-1} \leq \Delta H \leq 95 \times 10^{-7} \,{}^\circ K^{-1}$.

11. Gas laser according to claim 2, wherein said first material is hard glass.

12. Gas laser according to claim 2, wherein said first material is soft glass.

13. Gas laser according to claim 2, wherein said first material is hard glass, and $45 \times 10^{-7} \,{}^\circ K^{-1} \leq H_1 \leq 60 \times 10^{-7} \,{}^\circ K^{-1}$.

14. Gas laser according to claim 2, wherein said first material is soft glass, and $70 \times 10^{-7} \,{}^\circ K^{-1} \leq H_1 \leq 100 \times 10^{-7} \,{}^\circ K^{-1}$.

15. Gas laser according to claim 1, wherein said first and third materials are soft glass.

* * * * *